United States Patent
Ferguson

(10) Patent No.: US 9,392,267 B2
(45) Date of Patent: Jul. 12, 2016

(54) SYSTEM AND METHODS TO MEASURE NOISE AND TO GENERATE PICTURE QUALITY PREDICTION FROM SOURCE HAVING NO REFERENCE

(75) Inventor: Kevin M. Ferguson, Beaverton, OR (US)

(73) Assignee: TEKTRONIX, INC., Beaverton, OR (US)

( * ) Notice: Subject to any disclaimer, the term of this patent is extended or adjusted under 35 U.S.C. 154(b) by 0 days.

(21) Appl. No.: 12/969,338

(22) Filed: Dec. 15, 2010

(65) Prior Publication Data
US 2012/0154601 A1    Jun. 21, 2012

(51) Int. Cl.
H04N 19/154    (2014.01)
H04N 17/00    (2006.01)

(52) U.S. Cl.
CPC ............ *H04N 17/00* (2013.01); *H04N 19/154* (2014.11)

(58) Field of Classification Search
CPC ............... G06T 2207/30168; G06T 5/002; H04N 19/154; H04N 19/146
USPC .......................... 382/275, 238, 100
See application file for complete search history.

(56) References Cited

U.S. PATENT DOCUMENTS

| | | | |
|---|---|---|---|
| 6,359,658 B1 | 3/2002 | He et al. | |
| 7,668,397 B2 * | 2/2010 | Le Dinh et al. | 382/275 |
| 8,036,485 B2 * | 10/2011 | Ferguson et al. | 382/266 |
| 2004/0120579 A1 | 6/2004 | Cemic | |
| 2004/0120597 A1 | 6/2004 | Le Dinh | |

FOREIGN PATENT DOCUMENTS

| | | |
|---|---|---|
| CN | 101562675 A | 10/2009 |
| DE | 43 41 760 A1 | 6/1995 |
| DE | 4341760 A1 | 6/1995 |
| WO | 2006/099743 A1 | 9/2006 |
| WO | 2006099743 A1 | 9/2006 |

OTHER PUBLICATIONS

Kwon et al., A Novel Video Quality Impairment Monitoring Scheme over an IPTV Service with Packet Loss, 2010 Second International Workshop on Quality of Multimedia Experience (QoMEX) [on-line], Jun. 21-23, 2010, pp. 224-229. Retrieved from http://ieeexplore.ieee.org/xpls/abs_all.jsp?arnumber=5516127&tag=1.*

(Continued)

*Primary Examiner* — Matthew Bella
*Assistant Examiner* — Dennis Rosario
(74) *Attorney, Agent, or Firm* — Michael A. Nelson; Marger Johnson

(57) ABSTRACT

Embodiments of the invention include a system and method to generate a quality rating prediction, such as MOS, of a video under test without using a second video as a reference. Instead of using a reference video, embodiments of the invention generate a pseudo reference video from measuring local impairments of the video under test. The local impairments are then accumulated to create a difference image. The difference image is then subtracted from the video under test to create the pseudo reference, to which the video under test is compared to generate the quality prediction rating. In some embodiments the local impairments may be measured by separating high frequency noise from the video under test from the video itself. Once separated, the noise is then measured and bandwidth compensated to generate the measured local impairments.

10 Claims, 6 Drawing Sheets

(56) References Cited

OTHER PUBLICATIONS

Guo et al., Gabor Difference Analysis of Digital Video Quality, IEEE Transactions on Broadcasting [on-line], Sep. 2004, pp. 302-311. Retrieved from http://ieeexplore.ieee.org/xpls/abs_all.jsp?arnumber=1337088.*

Tomich et al., Expert Pattern Recognition Assessment of Image Qualty, 1989 International Conference on Acoustics, Speech, and Signal Processing, 1989 [on-line], May 23-26, 1989, vol. 3, pp. 1799-1802. Retrieved from http://ieeexplore.ieee.org/xpls/abs_all.jsp?arnumber=266800.*

Wang et al., Mean Squared Error: Love It or Leave It? A new look at signal fidelity measures [on-line], Jan. 2009 [retrieved Aug. 13, 2014], vol. 26, Issue: 1, pp. 98-117. Retrieved from the Internet: http://ieeexplore.ieee.org/xpls/abs_all.jsp?arnumber=4775883&tag=1.*

European Search Report from EP No. 11189899.5, dated May 8, 2014, 5 pages.

European Search Report from EP No. 11189899 .5, dated Jul. 31, 2014, 10 pages.

* cited by examiner

SYSTEM AND METHODS TO MEASURE NOISE AND TO GENERATE PICTURE QUALITY PREDICTION FROM SOURCE HAVING NO REFERENCE

BACKGROUND

Video broadcasters such as network and cable TV companies receive a tremendous amount of video data from content providers and local TV stations for rebroadcast to viewers. Since the broadcasters did not originally generate the video themselves, they typically are not aware of its quality before receiving it. When poor quality video is distributed, however, end-user customers oftentimes complain directly to the broadcaster about poor quality video, regardless of the source of the degradation. Thus there is a continued need for these broadcasters and others to assess video and rate it on a subjective quality scale that comports with their "golden eyes" internal viewers and customers' assessments.

The video industry creates tools to predict subjective quality in video, but these tools have limitations. Generally these tools suffer when comparing cascaded-processed videos, for example those where video impairments may have been caused by more than once source, such as compressing, de-compressing, then re-compressing the video with different parameters. More importantly, because these tools are generally designed to measure degradation for a particular process, such as compression or transmission across an imperfect channel, the tools require access to the video in both the original and degraded forms to be able to make the comparison. An example process is described in U.S. Pat. No. 6,975,776, "Predicting Human Vision Perception and Perceptual Difference," which is incorporated by reference herein. In the scenario where the broadcaster receives a video from a third party source, however, only a single video is available, with no reference to compare it to.

Side-to-side video comparison tools also struggle with generating accurate subjective quality measurements in situations where the original (reference) video is of such poor quality that even a very accurate reproduction has poor quality. For instance, when the original video has poor quality factors such as softness, noise, poor or no color, poor contrast, clipped whites and blacks, etc., even an extremely accurate copy will look poor, and draw complaints from end users.

Other prior art tools measure specific impairments such as block artifacts caused by macroblock border discontinuities, detail loss, softness, noise, then add them together to produce a Mean Opinion Score (MOS) of viewers. However, the accuracy of these methods is generally limited due to insufficiently accurate representations of the human vision response, both perceptive and cognitive.

Embodiments of the invention address these and other limitations of the prior art.

DETAILED DESCRIPTION

Embodiments of the invention are directed to a system and methods for predicting subjective picture quality when no reference is available. Sometimes this is referred to as a no reference measurement, because only a single video stream is available for measurement, making it impossible to directly measure a video stream against a reference video stream.

Figure 1:
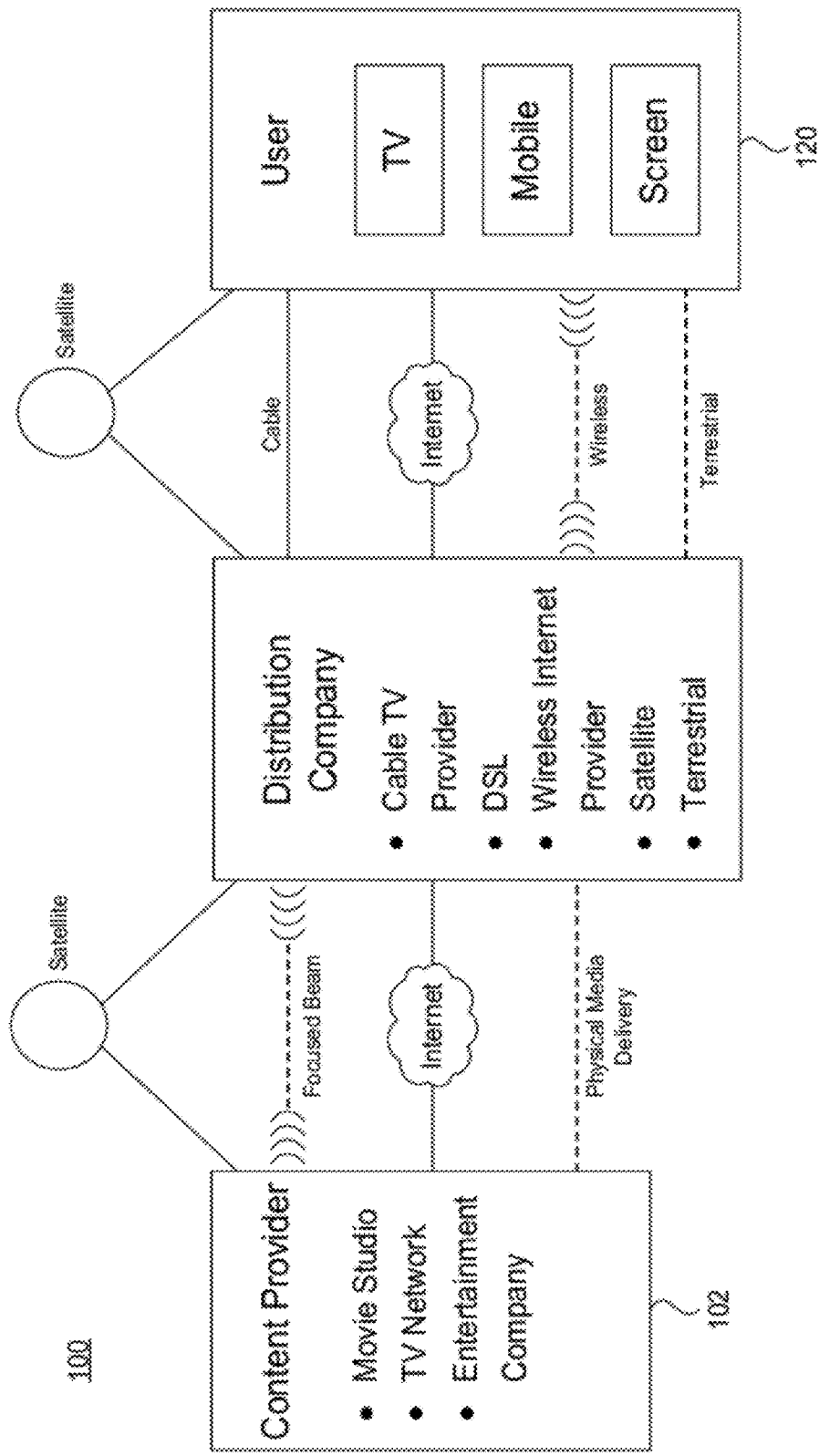
FIG. 1 is a block diagram of a video delivery system including content providers, broadcasters, and users according to the prior art.

FIG. 1 is a block diagram of a conventional video delivery system 100. In this example, starting content, such as a movie or television show is sent from a content provider 102 to a distribution company 110. For convenience, the content is referred to as a video, although the content may include almost any type of digital data. The content provider may deliver a physical copy of the video, which may be the movie or television show described above, by physically delivering one or more files on media such as a disk or set of disks. However, because physical delivery necessarily includes transportation delays and expenses to generate the physical media, this method of delivery is no longer widely used. More commonly the video is delivered to the distribution company 110 through a satellite feed, a terrestrial beam such as microwave transmission, or through the internet if there is enough bandwidth between the provider 102 and distribution company.

The distribution company 110 packages the video for delivery to its users 120, which may include compressing the video, splicing it to insert advertisements and other locally inserted information, etc. Then the distribution company 110 transmits the modified video to its users 120, who may view the end-product video on a television, mobile device or other screen. Transmission may be over a coax cable, such as in the case of cable television, twisted pair phone lines, through a wireless connection or through the internet, for example.

As described above, the distribution company 110 desires its video to be delivered at a quality that satisfies its users 120. To judge quality the distribution company 110 typically compares the video content as received to the video content transmitted. The video received from the content provider 102 may differ from the video transmitted to the end user 120 because of the processing performed by the distribution company 110, such as compression or other processes. However, when the quality of the video received from the content provider is unknown, it is difficult to assess how much compression, or other processes, that the distribution company 110 can perform while still maintaining a high enough quality to satisfy its end users 120. Thus there is a need for the distribution company 110 itself to determine the quality of the incoming video, which, by definition, does not have a reference to compare it to.

Figure 3:
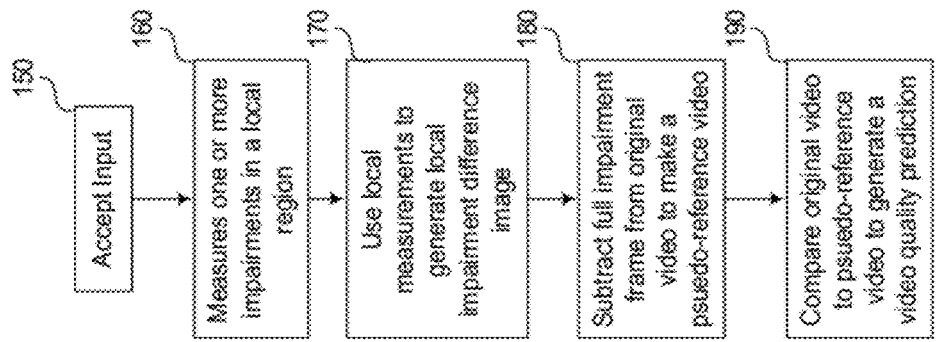
FIG. 3 is a flow diagram of an example method of predicting subjective picture quality when no reference is available, according to embodiments of the invention.
Figure 2:
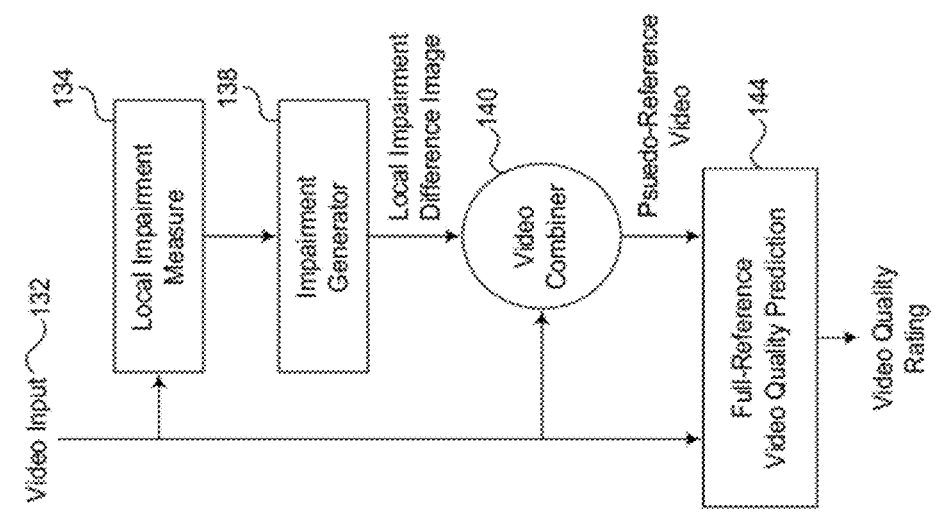
FIG. 2 is a block diagram illustrating an example quality prediction system that uses a single input according to embodiments of the invention.

Embodiments of the invention generate a video quality rating from a single source of video input. One of the factors that makes measuring noise within frames of digital video difficult is that, unlike analog signals that included blanking intervals of no data during which noise could be measured, digital signals typically have no such blanking period. With reference to FIGS. 2 and 3, a video input 132 may be received in a process 150 by a distribution company, or other entity or person who wishes to evaluate the received video. A process 160 then measures one or more impairments, such as noise, mosquito noise, blockiness, blur, jerkiness, freeze frame, jaggies, and ringing, etc., over a particular area of a frame of video. The area may be defined as one or more individual pixels, a block, multiple blocks, or an entire frame, for example. With reference to FIG. 2, a local impairment measurer 134 may be a process running on programmed hardware to measure the impairments, such as the measuring system described in detail below with reference to FIGS. 4 to 7D.

After one or more of the local impairments are measured, an impairment generator 138 builds a Local Impairment Difference Image (a "difference image") from the measured impairments in a process 170. One way of making the difference image is to create the difference image starting from an effective blank slate, i.e., a frame that is completely grey. Using this method, as each local impairment is measured, the same amount of impairment is added to the originally grey frame. For example, if 40 dB of noise is measured in a certain area of the original video by the local impairment measurer 134, then 40 dB of noise is added to the difference image for the same certain area of the grey frame. Likewise, if 23% lost detail is measured, then 23% of "detail" is generated and subtracted from the grey frame. Lost detail may be generated by generating random noise, imprecise image reconstruction, edge mis-translation, and other methods, for instance. All local impairments measured in their locality of the local basis (pixel for noise, block for block related impairments, etc) are aggregated to create the full difference image.

Another way of generating the difference image does not use the grey frame at all, but rather ameliorations to the measured local impairments are applied to the original signal derived from the video input 132 and the resulting image is subtracted from the original input video frame to create the difference image. Again, the full difference image is created from the amalgamation of all of the local impairment measurements.

Once the difference image is generated, regardless of the way it was generated, it is combined with the original video input to create a pseudo reference video in a process 180. With reference to FIG. 2 the combination may be performed in a combiner 140. In practice the combiner 140 may be a differencing process that subtracts the difference image from the original video and the resulting video is the pseudo reference video, although other methods of combining the original video input 132 to the difference image are possible.

Once the pseudo reference video is created, both the original video and pseudo reference video are provided to a full reference video quality predictor 144, which may incorporate systems and methods in the '776 patent incorporated above to generate a final video quality rating. In some embodiments the final video quality rating includes a Mean Opinion Score. The final output quality rating may be then be useful to the distribution company 110 to decide how to process the incoming video content. For example, if the incoming video is already poor, the distribution company 110 may not compress the video as much as it would otherwise. Additionally, if the quality is very poor, it may reject the video outright and require that the content provider 102 provide a better quality video.

Figure 4:
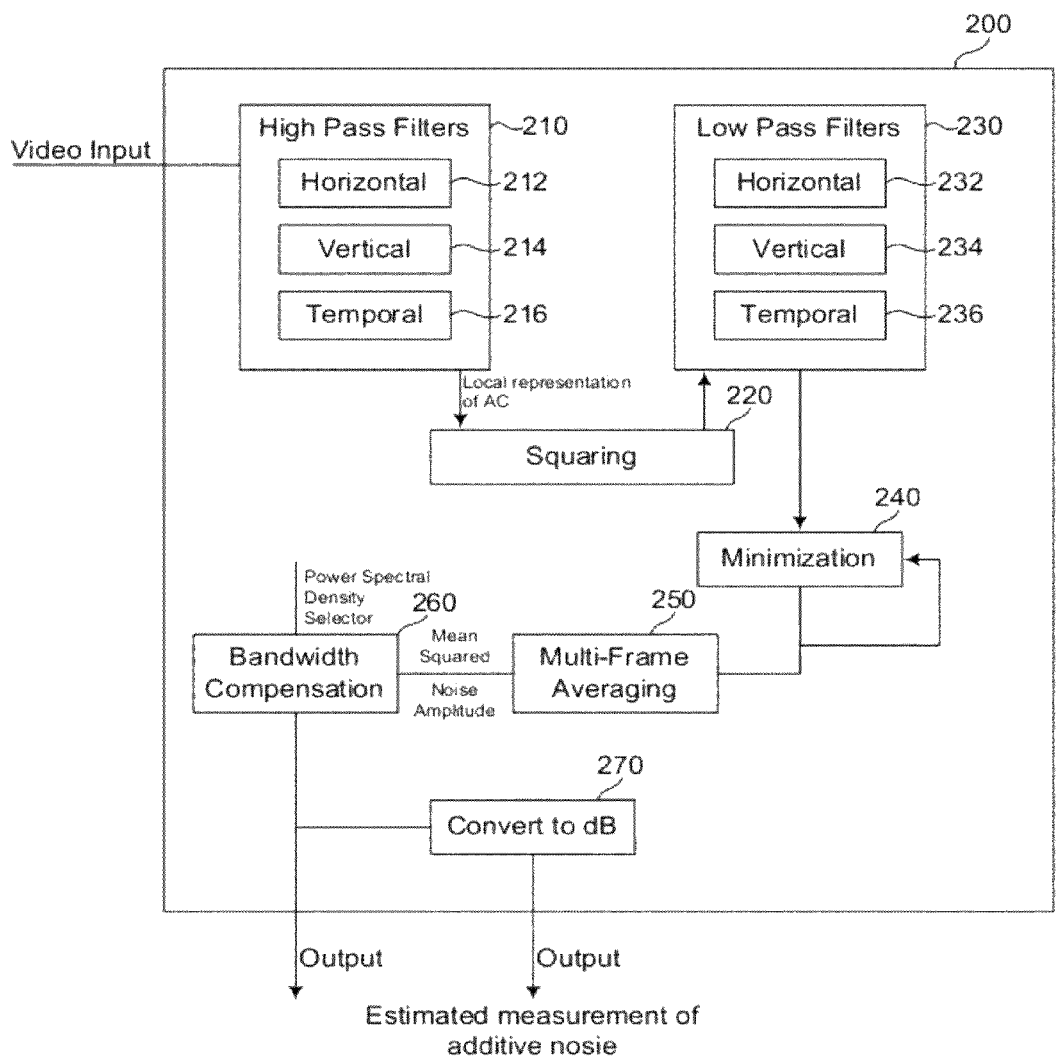
FIG. 4 is a functional block diagram of a system to measure local impairments of one or more frames of video, according to embodiments of the invention.

With reference now to FIG. 4, details of a local impairment measuring system 200, which may be an example embodiment of the local impairment measurer 134 of FIG. 2, is shown. The impairment measuring system 200 accepts a single video input, or in some cases a single image, and generates an output that is a measure of estimated additive noise of minimum variance over space and time in the intersection of the upper horizontal, vertical, and temporal frequencies.

After accepting the input of the video under test, the video is first filtered through one or more high pass filters in a high pass filter block 210. Typically the filtering is performed in three dimensions—horizontal, vertical, and temporal, in the respective high-pass filters 212, 214, and 216. A static image would not be temporally filtered, because it does not change over time. A three-dimensional movie could be filtered in four dimensions, one filter for each of X, Y, and Z dimensions, plus the temporal filter. The output of the high pass filter block 210 is a local representation of the AC portion of the video images. This output has a by-definition zero mean. Further, the locality of the measurement can be controlled by adjusting the low-pass cut-off frequencies of each of the three filters 212, 214, 216.

The output of the filter block 210 is then mathematically squared in a squaring process 220 before being passed to a low pass filter block 230. The filter block 230 then filters the output of the squaring process 220 through one or more low pass filters 232, 234, and 236 to obtain a local mean squared AC amplitude of the video. This local mean squared AC amplitude represents the local variance of the video under test.

A minimization process 240 determines the minimum variance per measurement sample within the three dimensional space to find the minimum local variance in space and time for each of the sample periods. For instance, the sample period may be 0.1 seconds and the minimization process 240 will generate an output (and re-set itself) at each period. The minimum local variance value during the sample period from the minimization process 240 may then be averaged in a multi-frame averaging process 250 to produce a mean squared noise (variance) amplitude. To then estimate the noise that was out of the measurement bandwidth, the output of the averaging process 250 may be bandwidth compensated in a compensator 260. For instance, the noise that was measured in a portion of the frame can be expanded to the full frame. The bandwidth compensated estimate of noise may then be converted to dB in a process 270, or may be output directly from the compensator 260. Each of the processes described above is now described in more detail.

Figure 5:
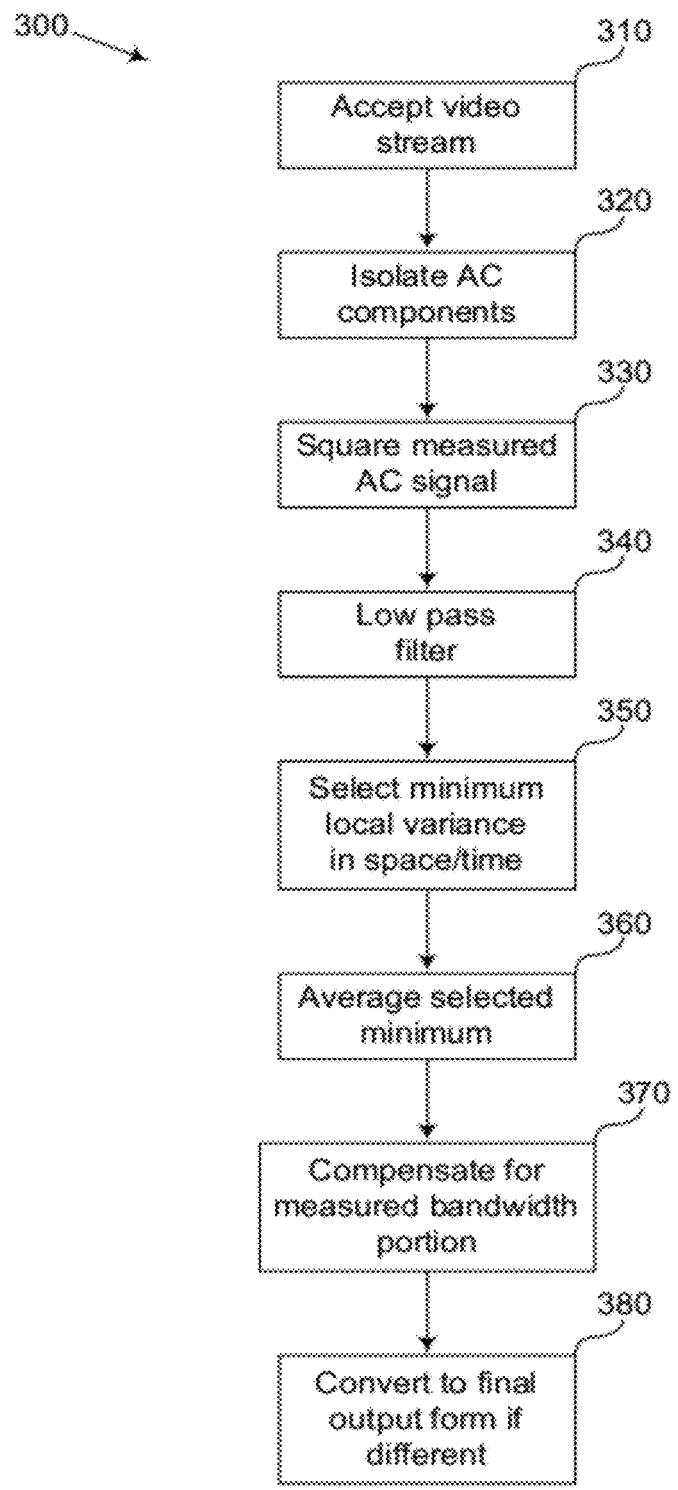
FIG. 5 is a flow diagram of an example method of measuring local impairments of one or more frames of video, according to embodiments of the invention.
Figure 6:
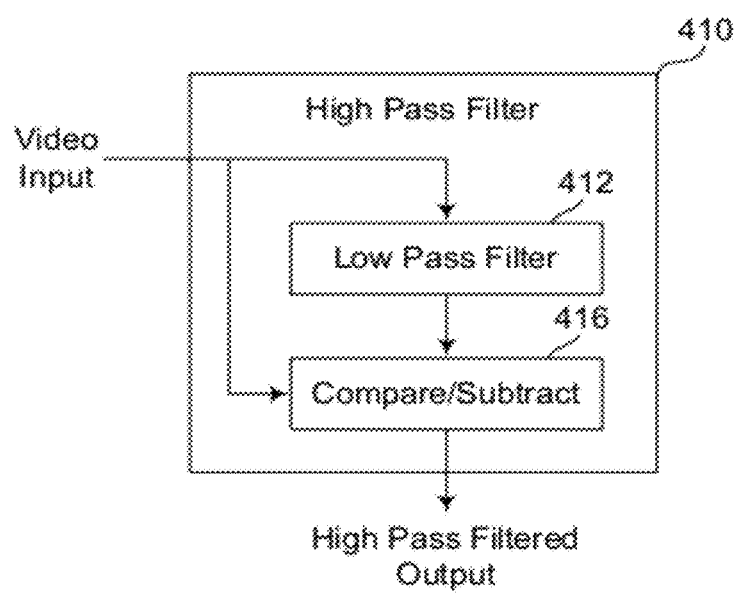
FIG. 6 is a functional block diagram illustrating a high pass filter arrangement according to embodiments of the invention.

With reference to FIG. 5, a flow 300 begins by accepting a video stream of a video under test at a process 310. In a process 320, the AC components of the video in each dimension are isolated, which is another way of stating that the DC components are removed, also in each dimension. As described above, static images are not temporally filtered, as there is no time component to filter. Removing the AC components is accomplished by passing the video under test through a cascaded series of high pass filters, such as those illustrated in FIG. 4. A generalized version of a single high pass filter 410 is illustrated in FIG. 6. The high pass filter 410 first passes an input video signal through a low pass filter 412 to remove the high frequencies. Then a combiner/subtractor 416 compares the output of the low pass filter 412 to the original input video signal and, based on the comparison, removes the low frequency portions of the original signal. This produces a resulting output of the high pass filter 410 that is an isolation of only the AC components of the original input video signal.

In practice the high pass filters 212, 214, 216 may be implemented by bi-directional, fixed, infinite impulse response (IIR) filters Preferred embodiments of the filters include (a1=1−b0) IIR filters where the spatial filters are bidirectional but temporal filters are not. Example filters that can be used include those described in U.S. Pat. No. 6,907,143, which is incorporated herein by reference. Low pass filter coefficients may be chosen to have a pass-band corresponding to the best combination of passing the desired signal and rejecting high frequency noise. Exact values, of course, are implementation specific and depend on resolution, video source, video processing such as up or down-sampling, graphics insertion, etc. A cut-off frequency of roughly ¼ of the sample frequency is generally a good starting point for filter selection.

In practice the local impairment measuring system 200 is a large improvement in computational efficiency and accuracy as compared to block averaging, such as that described in U.S. Pat. No. 6,433,819, running block averaging, or systems that use FIR filtering or unidirectional IIR filters.

Figure 7A:
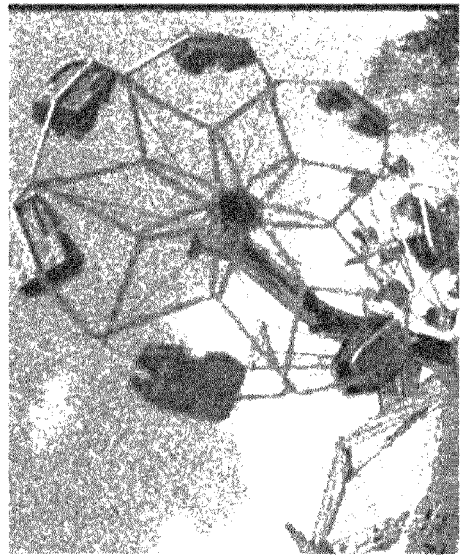
FIG. 7A is a base image used for illustrating concepts of the invention.
Figure 7B:
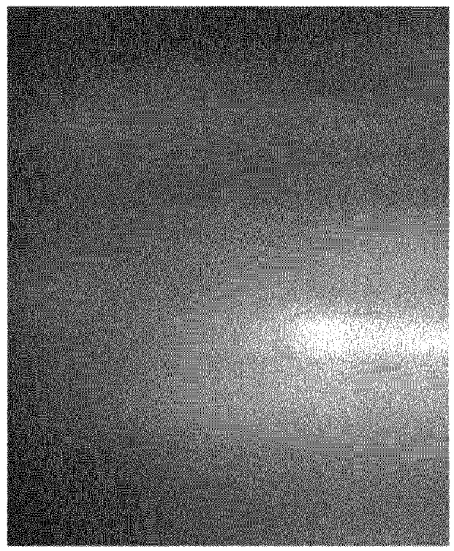
FIG. 7B is an image resulting from adding a given amount of white noise to the image of FIG. 7A.
Figure 7C:
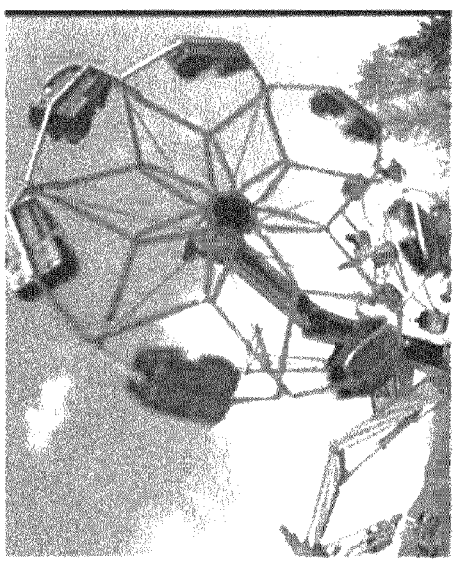
FIG. 7C is an image illustrating the output when the image of FIG. 7B is passed through a series of high pass filters according to embodiments of the invention.

With reference to FIGS. 7A, 7B, 7C, and 7D, FIG. 7A is a base test image used to explain concepts of the invention. FIG. 7B is the test image of FIG. 7A that has had a certain amount of noise specifically added to it so that, when the noise is measured by the local impairment measurer 200, the final answer can be compared back to the levels of noise that were added as a test of the accuracy of the measurement system. Just over −20 dB of noise was added to the clear frame of video in FIG. 7A to make FIG. 7B. FIG. 7C is the output of using the image of FIG. 7B as an input to the high pass filters 210 of the local impairment measurer 200 of FIG. 2, and then adding that result to a grey image so that it may be seen. Note that low frequency changes, such as the large area brightness differences in the sky, are attenuated relative to the image of FIG. 7B.

After the AC components are isolated in the process 320, the local AC signal is squared in a process 320 (FIG. 5) then filtered through a series of low-pass filters in a process 340 to obtain a local mean squared AC amplitude of the video. This local mean squared AC amplitude represents the local variance. In some embodiments the low pass filters 232, 234, and 236 of FIG. 4 are the exact low pass filters that make up the components of the respective high pass filters 212, 214, 216. More specifically, recall that, for example, a low pass horizontal filter 232 is a component in the high pass horizontal filter 212, as illustrated in FIG. 6. Thus, the same low pass filters are also used in the low pass filtering block 230. The output of the low pass filter block is the local variance in space and time of the video sample.

Figure 7D:
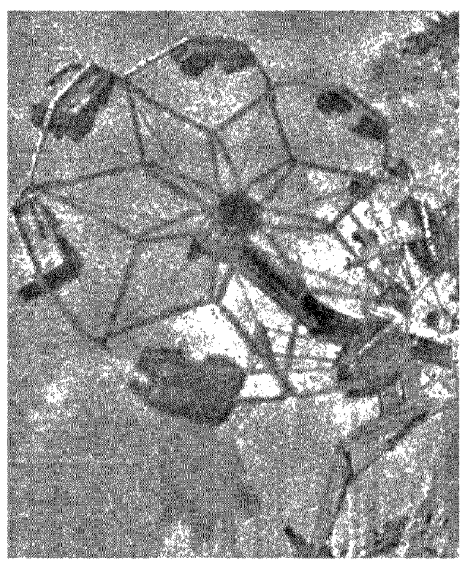
FIG. 7D is an image illustrating the output when the image of FIG. 7C is passed through a series of low pass filters according to embodiments of the invention.

FIG. 7D is a visual representation of the low pass filter output of the sample-wise squared high-pass filtered image shown in FIG. 7C. Thus FIG. 7D is a visual representation of the local variance.

A minimum is determined in a process 350 by finding the minimum of the local variance within the three-dimensional space. After the minimum is determined, multiple frames are averaged in a process 360. The averaging process 360 may include running average, IIR, or other filter methods appropriate for the desired update rate. An adaptive IIR may be best suited to produce an estimate of the mean squared noise, or variance, amplitude. In the case of a static image, the outcome of the frame average is the same as its input—a single sample.

A process 370 modifies the output of the averaging process by compensating the measurement based on a percentage of video bandwidth that was used to estimate the noise measurement. The bandwidth of the high pass filters 210 is calculated as a ratio of the entire video bandwidth to compensate for the portion of the video signal blocked by the high pass filters. This percentage may be determined in a number of ways as is known in the art. For example, the power output ratios of each filter output vs input are multiplied to produce a composite power ratio, and then the ratio used to increase the estimated output given by the averaging process 360. To create the ratio, a selection of which power spectral density to use is made by the user with an input to the bandwidth compensator 260. For example, the power spectral density of white noise is substantially constant over the frequency response, while the power spectral density of pink noise is substantially 1/f. Using the selected power spectral density, such as white noise, pink noise, Brownian noise, or other, then allows the bandwidth compensator 260 to extrapolate the measured noise to the entire frame for an accurate measurement.

In a final optional process 380 the bandwidth compensated measurement output of the process 380 may be converted into a standard measurement, such as dB, for display to the user. In embodiments where the measuring circuit 200 of FIG. 4 is merely a component of a larger system, such as the picture quality prediction system of FIG. 2, the measurement may not be converted, but rather passed directly to the impairment generator 138.

Embodiments of the invention may be implemented in computer hardware, such as an Application Specific Integrated Circuit (ASIC), or in software as processes running on special or general-purpose processors. Typically a system will use a variety of implementation methods where certain portions operate on particularized hardware, such as a programmed Field Programmable Gate Array (FPGA), while other portions operate as software running on a general purpose processor, such as a processor by INTEL of Santa Clara, Calif.

The invention may be embodied in various products, such as a waveform monitor that accepts one or more video signals in one or more inputs, performs various measurement processes on the signals, and generates outputs in the form of a display on the monitor or data in an output file. Similarly, embodiments of the invention may appear in a picture quality analyzer that may accept one or more images as inputs, performs various measurement processes on the images, and generates an output for display on a monitor or stored as an output file. Such monitors and analyzers include various inputs for interacting with a user, such as menus that can be navigated and selected using inputs such as a keyboard, mouse, trackpad, selection knobs and buttons, etc.

Although the description above is given with reference to a two-dimensional image or video signal, embodiments of the invention may be used in other applications where signal and noise have statistically localized spectral separation. For example these techniques may be used on single channels such as audio or RF transmission. Likewise, these methods and techniques may be applied to signals with any arbitrary number of dimensions such as three spatial dimensions combined with a temporal component, i.e., three-dimensional images that change over time.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A method of generating a prediction of subjective picture quality from a single source of video input, comprising:
   accepting one or more video frames at a single input;
   aggregating a series of local impairments to produce a local impairment difference image for each of the one or more video frames including:
   measuring impairments of at least a portion of a current video frame to obtain a measured amount;
   adding the measured impairments to the current video frame to produce a video frame having added impairments; and
   subtracting the video frame having the added impairments from the current video frame to produce the local impairment difference image;
   combining the local impairment difference image with a respective frame of the originally accepted one or more video frames to create a pseudo reference; and
   comparing the originally accepted one or more video frames with the pseudo reference to yield the prediction of subjective picture quality.

2. The method of generating a prediction of subjective picture quality from a single source of video input according to claim 1 in which measuring a series of local impairments comprises measuring noise within the one or more frames.

3. The method of generating a prediction of subjective picture quality from a single source of video input according to claim 1 in which measuring a series of local impairments comprises measuring impairments in a block of a current frame of the one or more video frames.

4. The method of generating a prediction of subjective picture quality from a single source of video input according to claim 3 further comprising measuring an impairment in one or more pixels of the current frame.

5. The method of generating a prediction of subjective picture quality from a single source of video input according to claim 1 in which the prediction of subjective picture quality is a Mean Opinion Score.

6. A method of generating a prediction of subjective picture quality from a single source of video input, comprising:
   accepting one or more video frames at a single input;
   measuring a series of local impairments within the one or more video frames;
   aggregating the series of measured local impairments to produce a local impairment difference image for each of the one or more video frames including, in which aggregating the series of measured local impairments to produce a local impairment difference image comprises adding the measured series of local impairments to uniform video frame;
   combining the local impairment difference image with a respective frame of the originally accepted one or more video frames to create a pseudo reference; and
   comparing the accepted one or more video frames with the pseudo reference to yield the prediction of subjective picture quality.

7. A video measuring device, comprising:
   a video input for accepting a video to test;
   a local impairment measurer structured to measure one or more impairments within one or more video frames of the tested video;
   an impairment generator structured to
   produce a local impairment difference image from the measured local impairments by measured impairments of at least a portion of a current video frame to obtain a measured amount,
   adding the measured amount of impairments to the current video frame to produce a video frame having the added impairments, and
   subtracting the video frame having the added impairments from the current video frame; and
   a pseudo reference video generator structured to produce a pseudo reference video from a combination of an output from the impairment generator and from the video to test.

8. The video measuring device of claim 7 further comprising a full-reference video quality predictor structured to accept the tested video and the pseudo reference video as inputs and to generate a prediction of subjective picture quality of the tested video.

9. The video measuring device of claim 8 in which the prediction of subjective picture quality includes a Mean Opinion Score.

10. The video measuring device of claim 7 in which the local impairment measurer is structured to measure at least one of noise, mosquito noise, ringing, blur, jerkiness, freeze frame, jaggies, and block effects of at least one frame of the tested video.

* * * * *